United States Patent [19]

Martinak

[11] Patent Number: 4,683,719

[45] Date of Patent: Aug. 4, 1987

[54] MAN MADE FLOATING ISLAND

[76] Inventor: Bonifac Martinak, 2639 Grove Ave., Berwyn, Ill. 60402

[21] Appl. No.: 813,967

[22] Filed: Dec. 27, 1985

[51] Int. Cl.⁴ .............................................. F16D 31/02
[52] U.S. Cl. ...................................... 60/398; 60/502; 60/505; 417/333
[58] Field of Search .................. 60/398, 497, 502, 505; 290/42, 53; 417/331, 333

[56] References Cited

U.S. PATENT DOCUMENTS

| | | | |
|---|---|---|---|
| 844,174 | 2/1907 | McDuffee | 60/502 |
| 1,482,713 | 2/1924 | Stein | 417/331 |
| 1,852,145 | 4/1932 | Brown | 417/331 |
| 3,697,764 | 10/1972 | Stanziola et al. | 290/42 |
| 3,894,241 | 7/1975 | Kaplan | 290/42 |
| 4,284,901 | 8/1981 | Giguere | 290/53 |

FOREIGN PATENT DOCUMENTS 1134785  1/1985  U.S.S.R. ................... 290/53

Primary Examiner—Stephen F. Husar
Attorney, Agent, or Firm—Hill, Van Santen, Steadman & Simpson

[57] ABSTRACT

A man-made floating island includes platform units above the water with vertical members extending downwardly therefrom on which movable floats are mounted which move in response to wave action. Motion of the floats operates air compressors and the resulting compressed air is either converted to transmissible energy or stored in reservoirs for future use. Wave amplifiers may be disposed beneath the movable floats.

15 Claims, 12 Drawing Figures

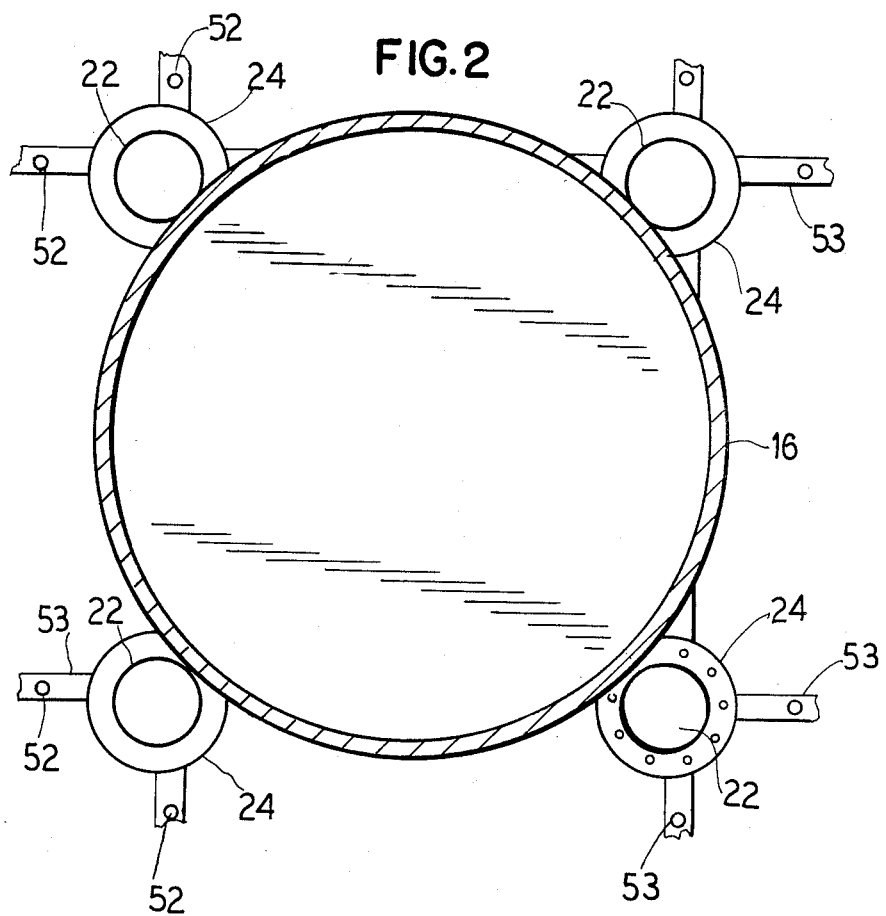

MAN MADE FLOATING ISLAND

BACKGROUND OF THE INVENTION

The present invention relates to a power plant for generating a supply of pressurized fluid, such as for driving fluid powered motors, which supply is derived from wave action and, more particularly, to a floating platform containing an array of wave action powered fluid compressors for supplying pressurized fluid to be utilized on the platform.

Various arrangements have been devised to derive power from the flow of ocean waves and tidal action. U.S. Pat. No. 3,746,875 discloses an electrical power plant driven by ocean waves and tides. The plant structure is a mounted on the ocean floor. A float means is adapted to reciprocate with wave and tide height within the plant structure and carry with it a gear rail. The reciprocating action of the gear rail drives rotary gears disposed atop the plant structure and drivingly connected to rotary electric generators.

Floating structures on the ocean surface are also known. For example, U.S. Pat. No. 4,286,538 discloses a multipurpose floating structure formed of a large number of floatational units joined in a regular pattern each having an inverted conical shape at its base with a vertical leg extending downwardly therefrom which units are anchored to the ocean floor. In one embodiment a multilayer structure is disclosed, and the floating structure may additionally include an electric generation apparatus including rotationally mounted vanes extending into the water for conversion of water current to energy. U.S. Pat. No. 3,965,365 describes a power generating station operated by ocean swells. The station is a floating structure. A power float is supported in the structure for driving a clutch and fly wheel.

SUMMARY OF THE INVENTION

The present invention affords a floating station which can be made self-sufficient with respect to the station's power requirements so that the station can support industry and/or habitation in the form a man-made island. The inventive floating station derives energy from ocean wave action to drive generators and motors disposed on the station. The invention further affords means for enhancing the energy-producing action of the waves.

The present invention provides a man made floating platform with an improved energy generation means. The platform can be used for any number of purposes including factories, military uses, oil drilling, hospitals, resorts, and the like. A frame extends below the platform into the sea which includes at least one vertically movable float riding on the sea surface to take advantage of the wave action. Means are provided for converting the vertical motion of the float to compressed fluid which is thereafter converted, in one embodiment, to electrical energy by a turbine and electric generator. Compressed fluid reservoirs are provided throughout the present device for storing compressed fluid so that energy can be produced during calm seas.

The present invention includes wave amplifiers disposed on the frame beneath the vertically movable float to increase the wave energy available to the movable float and to maintain stability of the floating platform. The wave amplifier is in the form of a compressed air reservoir in which additional compressed air can be stored for future use.

Propulsion means are also provided in the present device for maintaining horizontal stability of the platform and for moving the platform about in the sea The present device, in one embodiment, is especially suited for use in rough seas and allows the destructive power of waves and ice to move through the device with little resistance.

Further objects, features, and advantages of the invention will be apparent from the detailed description below.

BRIEF DESCRIPTION OF THE DRAWINGS

FIG. 2 is a cross-section of the device shown in FIG. 1 along lines II—II.

DESCRIPTION OF THE PREFERRED EMBODIMENTS

The present invention serves for compressing or otherwise pressurizing gas or liquid mediums on a floating platform as the result of wave action. For illustrative purposes, the preferred embodiments will be described using air as the medium being compressed and pressurized. The medium being compressed or pressurized in accordance with the invention is stored on the floating platform to be used as a working fluid, such as for driving electrical generators, to be used as shop air for manufacturign or laboratory work, etc.

Figure 1:
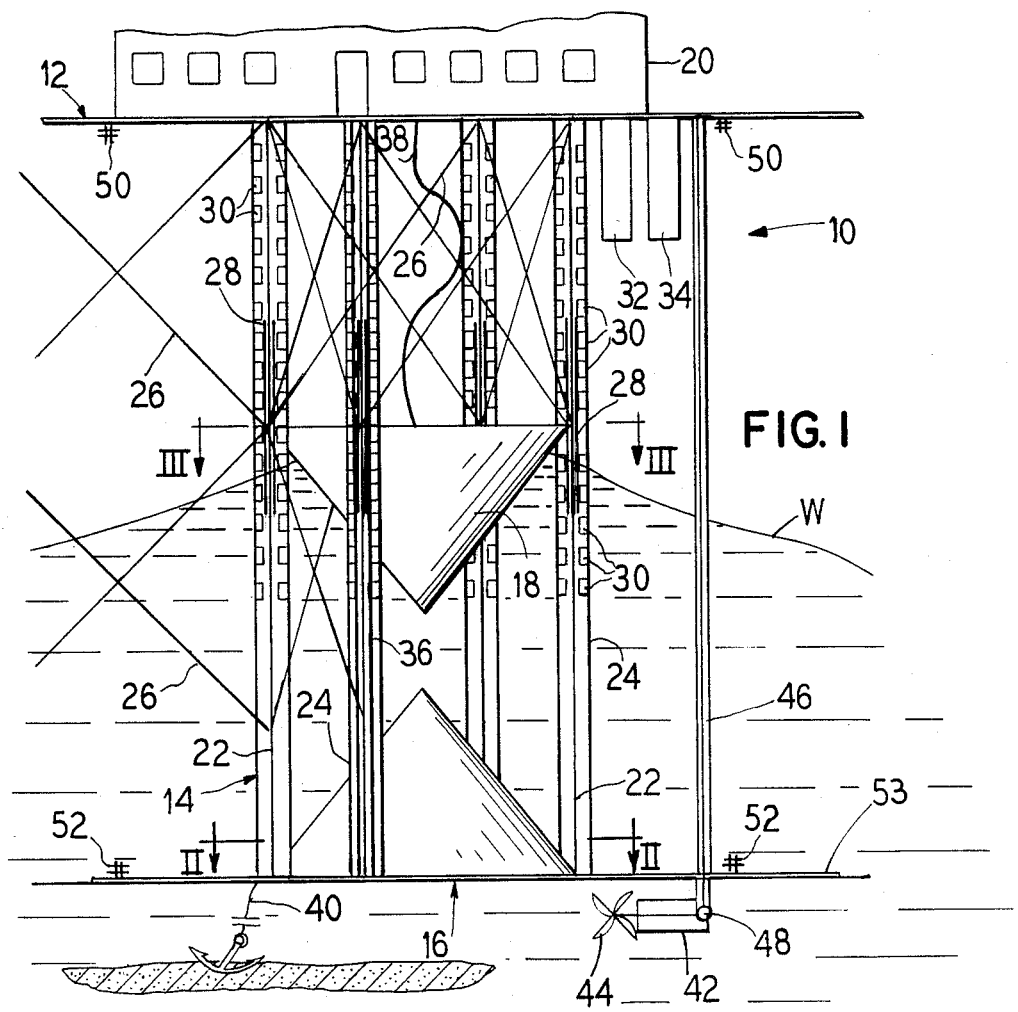
FIG. 1 is a side elevational view of an energy generating floating platform according to the principles of the present invention.

In FIG. 1, an energy generating floating platform is shown generally at 10 including a platform surface 12, a frame 14, a lower air reservoir 16, and a float 18. The platform surface 12 is shown having a building 20 disposed thereon which may be a factory, hospital, or other building. The platform surface 12 may also be used as a base for oil drilling, military operations, cities, or other uses. The frame 14 extends below the platform surface 12 and below the surface of the waves W yet does not extend to the sea floor. The frame 14 comprises vertically disposed posts 22 concentrically mounted within girders 24 that are held together by struts, or joints, 26.

Secured to lower ends of the posts 22 and girders 24 is a lower air reservoir 16. The lower reservoir 16, in a preferred embodiment, has a conical shape and is hollow so that compressed air can be stored therein. An apex of the conical lower reservoir 16 is directed upwardly so that waves passing over the conical reservoir are amplified in a vertical direction.

Mounted above the lower reservoir 16 is a vertically movable float 18 which rides the surface of the waves W. The float 18 is slidably mounted on the posts 22 and girders 24 by riders 28. The riders 28 encircle the posts 22 and are concentrically mounted within the girders 24, as will be described in conjunction with FIG. 3. The riders 28 are operatively connected to a plurality of compressors 30 mounted on the girders 24 at spaced locations therealong. Vertical movement of the riders 28 causes the compressors 30 to operate producing compressed air which is stored in the lower air reservoir 16 and in the float 18, or which is transmitted directly to an air turbine 32 mounted on the platform 12. Where the production of electricity is desired, the air turbine 32 is operatively connected to an electric generator 34 also mounted on the platform 12. The turbine 32 and 34 are preferably mounted to an underside of the platform 12 so that the top of the platform surface 12 is free of obstruction. Air conduits 36 and 37 are disposed within the girders 24 for supplying outside air to the compressors and for conducting compressed air from the compressors 30 to the lower reservoir 16 and to the air turbine 32, respectively. Flexible air conduits 38 transmits compressed air to and from the reservoir within the float 18.

Stability of the floating platform 10 is provided by anchor lines 40 connected to the frame 14 and anchored to the ocean floor and by propulsion means 42. The propulsion means 42, in one embodiment, includes a propellor 44 driven by a vertical propellor shaft 46 connected between the platform surface 12 and a gear mechanism 48. The propulsion means 42 also provides mobility for the floating platform unit 10 so that it can be relocated. The propeller shaft 46 may be driven by the air turbine 32, or by other drive means.

Connecting means 50 on the platform surface 12 and connecting means 52 on a lower frame portion 53 adjacent the lower reservoir 16 provide means for connecting the floating platform unit 10 to similar floating units 10 to construct a continuous platform surface and to increase the energy generating potential by supplying additional movable floats 18.

The conical shape of the lower air reservoir 16 and its position disposed beneath the movable float 18 are important since the lower reservoir 16 will restrict downward flow of waves W somewhat and will increase upward flow of the waves toward the float 18 to amplify the wave action. The lower reservoir 16 also adds stability to the platform unit 10. The conical lower reservoir 16 and the conical float 18 mounted in opposed directions enables waves to move through the device 10 with little resistance for further stability.

Figure 3:
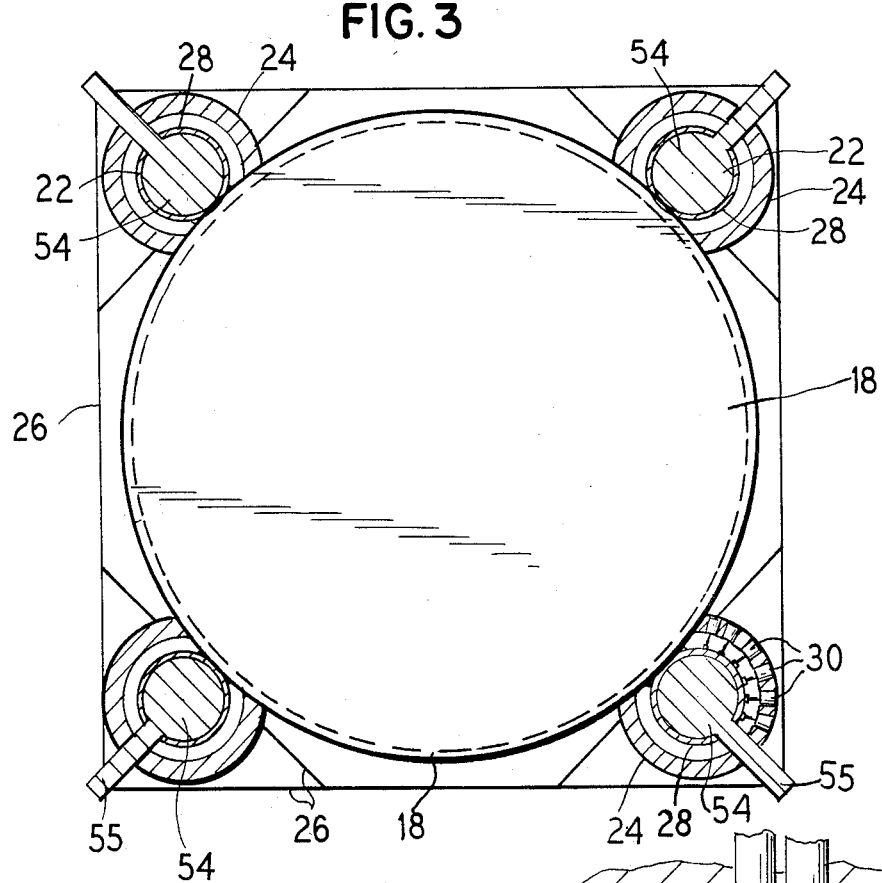
FIG. 3 is a cross-section of the device shown in FIG. 1 along lines III—III.

FIG. 2 shows the connections between the hollow lower reservoir 16 and the posts 22 and girders 24, as well as the lower frame 53. The lower frame 53 provides means for interconnecting a plurality of units 10, and is not required if a single unit is to be used. The connecting means 52 are shown in the form of bolts, although the use of other connectors are also contemplated. In FIG. 3, the riders 28 are connected to the vertically movable float 18. The riders 28 are semicircular in shape and embrace and slide along cylindrical portions 54 of the posts 22. Reinforcing fins 55 extend outward from the cylindrical post portions 54 opposite the float 18. The girders 24 encircle the cylindrical portions 54 and the riders 28, and support the compressors 30. A plurality of the compressors 30 are spaced radially along one or more of the girders 24. The reinforcing fins 55 include struts 26 connected therebetween for added durability.

Figure 4:
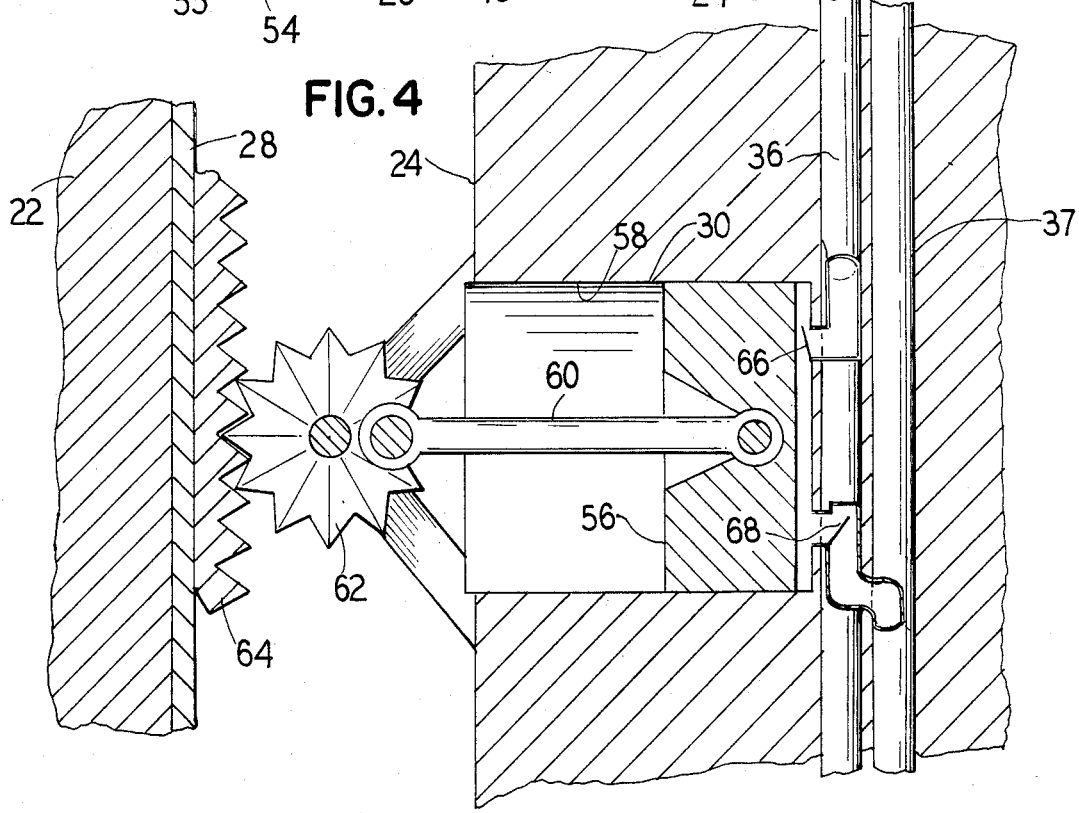
FIG. 4 is a schematic diagram of an air compressor unit for use in the device of FIG. 1.

A preferred embodiment of a compressor 30 is shown in FIG. 4 and includes a piston 56 slidably movable within a cylinder 58 mounted on the girder 24. The piston 56 is driven within the cylinder 58 by a piston rod 60 connected to a rotationally mounted geared wheel 62 which is driven by a geared rail 64 mounted on the rider 28. Outside air is supplied to the compressor 30 by supply pipe 36 mounted on the girder 24 and compressed air generated by the compressor 30 is fed to a compressed air conduit 37 also on the girder 24. Valves 66 and 68 control movement of air during operation of the compressor 30. As the float 18 moves on the waves, the rider 28 slides vertically on the post 22 during gear 62 and piston 56. Movement of the piston 56 in a first direction draws air into the cylinder 58 through valve 66 and piston 56 movement in a second direction compresses the air and forces it out through valve 68. The compressed air is either stored in a storage reservoir for future use or is used immediately in air turbine 32.

Figure 5:
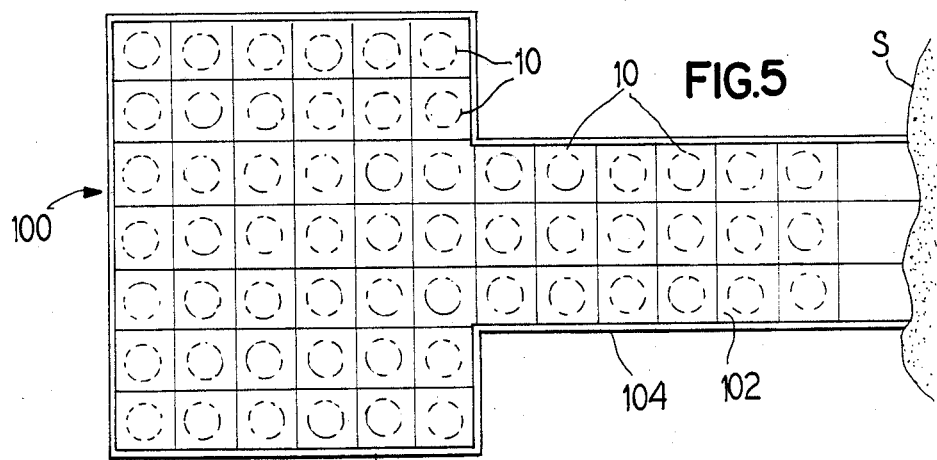
FIG. 5 is a plan view of a plurality of units of the type shown in FIG. 1 joined to form a platform.

In FIG. 5, a number of energy generating floating units 10 are shown connected to one another to form a continuous platform 100 having a bridge portion 102 connected to a shore line S. A preferred embodiment of the platform 100 has a railing 104 extending along the edges thereof which railing 104 is in the form of an extended storage tank and is connected to the air compressors 30. The railing 104, thus, serves a dual purpose; as a protective railing to prevent persons and objects from falling into the sea and as a compressed air storage. Other hollow structures on the platform 100 may also be used for compressed air storage.

Figure 6:
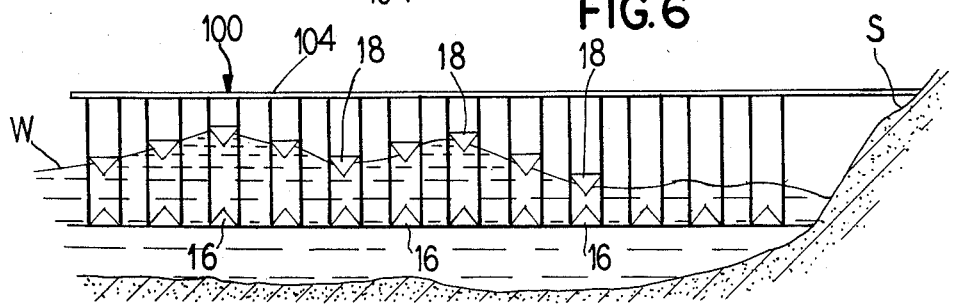
FIG. 6 is a side elevational view of the device shown in FIG. 5.

In a side view of the continuous platform 100 shown in FIG. 6, the movement of a plurality of the floats 18 can be seen on the waves W through which large amounts of power can be generated. Each of the units 10 can have its own air turbine 32 and electric generator 34, or the platform 100 can be supplied with a single high capacity turbine and generator (not shown).

Figure 7:
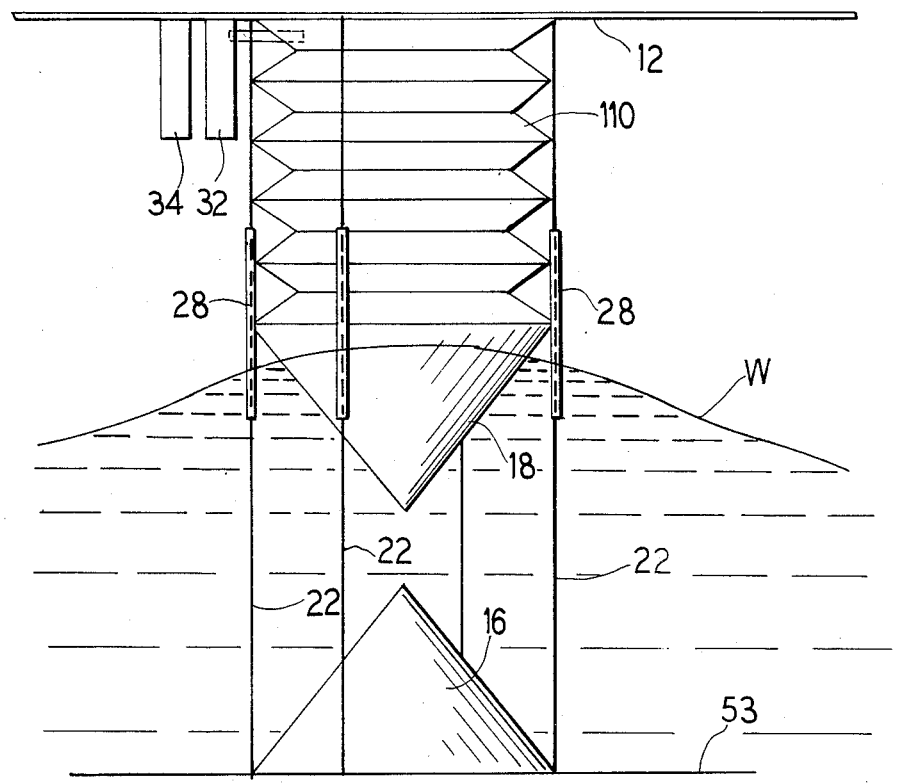
FIG. 7 shows a second embodiment of an energy generating floating platform according to the principles of the present invention.

In FIG. 7, a second embodiment of the present invention is shown including the conical lower reservoir 16, the conical float 18, and the platform surface 12 similar to that shown in FIG. 1. A vertically compressible bellows 110 extends between the top of the conical float 18 and the underside of the platform surface 12. The bellows 110 acts as a compressor to provide compressed air as the float 18 moves upward on the surface of a wave W. The compressed air can be stored in the lower reservoir 16 and the float 18, or the relatively low pressure air can be compressed even further by compressors 30 as shown in FIG. 4.

Figure 8:
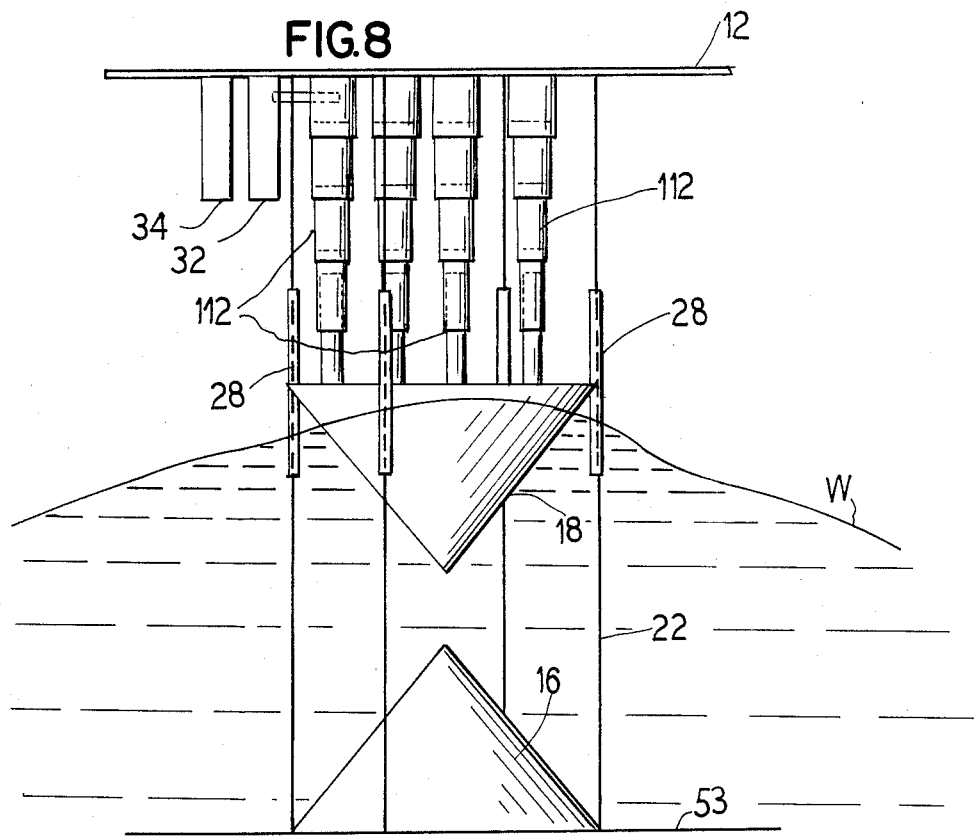
FIG. 8 shows a third embodiment of an energy generating floating platform according to the principles of the present invention.

FIG. 8 discloses a third embodiment of the present invention including telescoping air compressors 112 extending between the float 18 and the platform surface 12. The telescoping air compressors 112 function substantially the same as the bellows 110 of FIG. 7. It is within the contemplation of the invention that the telescopes be individually connected to compress different fluid mediums, such as air and other gases or liquids.

Figure 10:
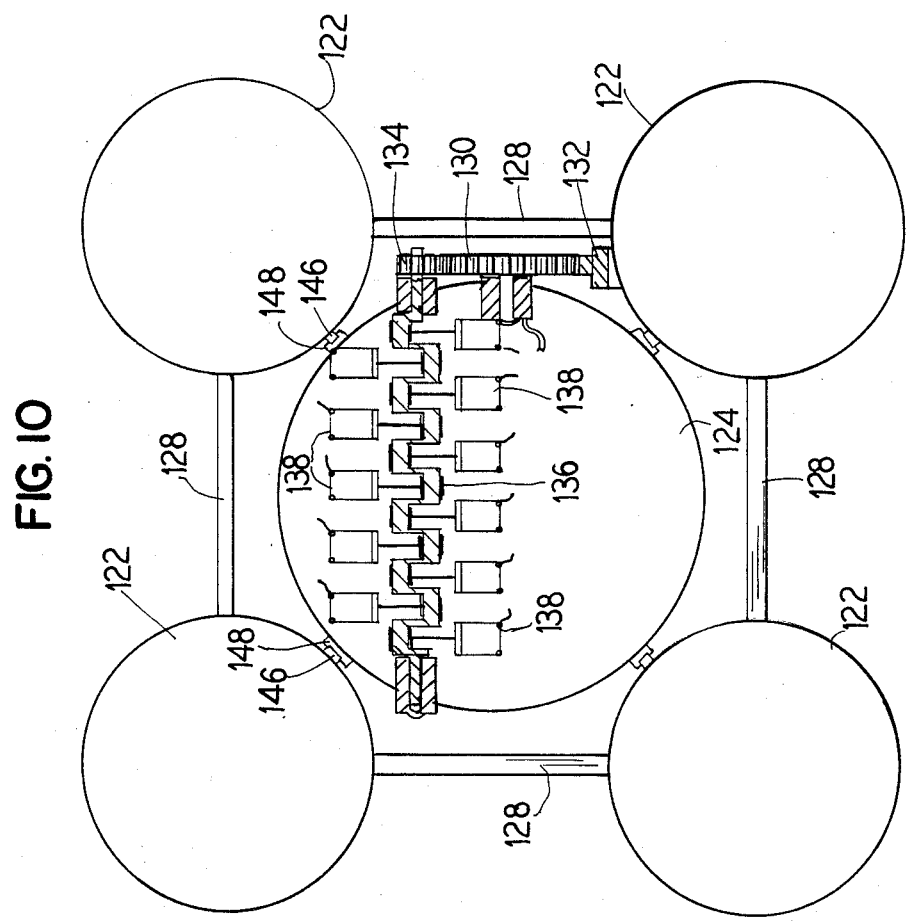
FIG. 10 is a cross-section of the device shown in FIG. 9 along lines X—X.
Figure 9:
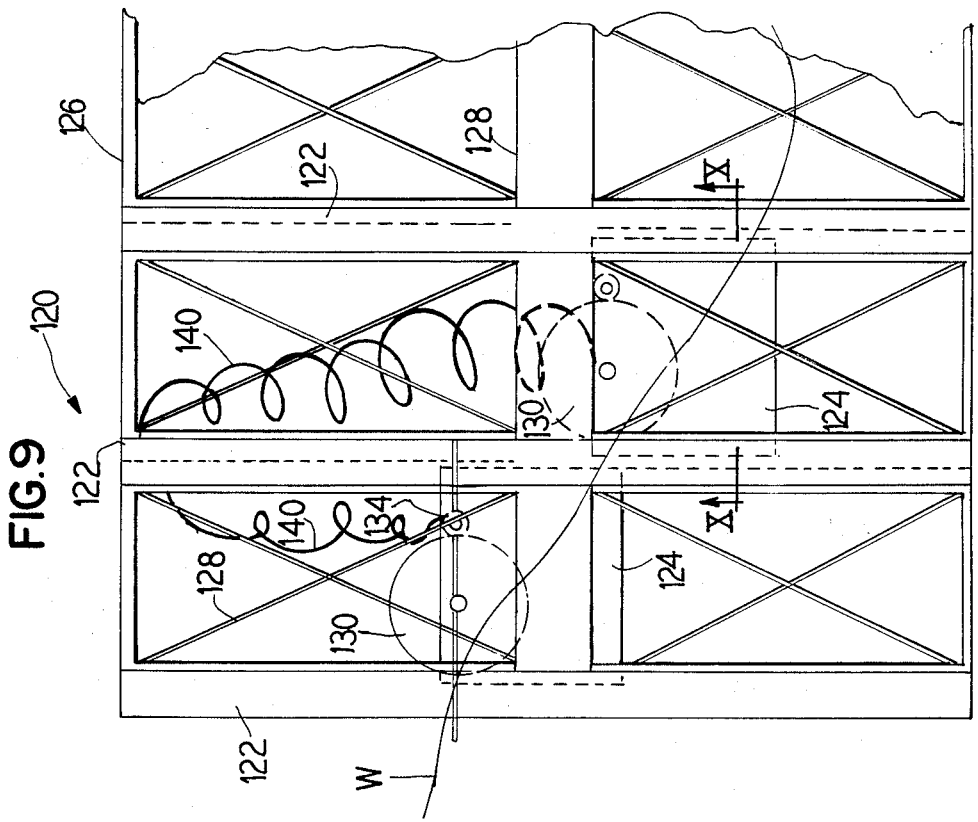
FIG. 9 is a side elevational view of yet another embodiment of a device according to the principles of the present invention.

Yet a further embodiment is a rough water platform unit, or island, denoted generally at 120 in FIG. 10. The unit 120 includes vertically disposed standing tubes 122 having mounted therebetween at least one movable float 124. The standing tubes 122, which do not extend to the sea floor, support a platform 126 at an upper portion thereof and are interconnected by struts 128 for strength. The standing tubes 122 are hollow and serve as reservoirs for compressed air.

The floats 124 are cylindrical in shape and move vertically between the standing tubes 122 in response to wave action. As can be seen more clearly in FIG. 11, the floats 124 include a large gear 130 mounted thereon which engages a geared rail 132 on one of the standing tubes 122. The large geared wheel 130 in turn drives pinion gear 134 which rotates a crank shaft 136 within the float 124. The crank shaft 136 drives a battery of compressors 138 which generate compressed air as a result of the vertical motion of the float 124. The compressed air from the compressors 138 can be stored in the float 124 and in the standing tubes 122. The compressed air may also be used to directly drive a turbine and electric generator (not shown). Flexible connectors 140 are connected to each one of the floats 124 through which outside air is supplied and through which compressed air is conducted to the turbine and the storage reservoirs.

Figure 11:
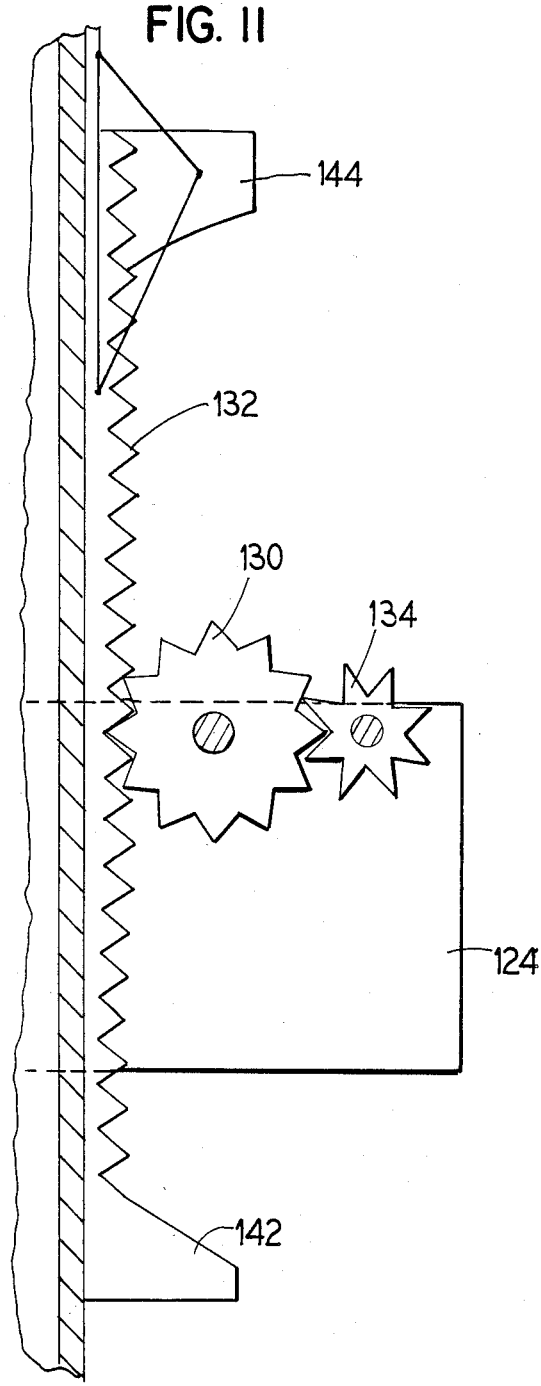
FIG. 11 is a fragmentary side elevational view of the gear means of the device shown in FIG. 9.

The geared rail 132 shown in FIG. 11 includes stop members 142 and 144 at opposite ends thereof to limit the vertical movement of the float 124 during extremely rough seas. The stop members 142 and 144 may be relocatable so that vertical movement of the floats 124 can be selectively limited.

Figure 12:
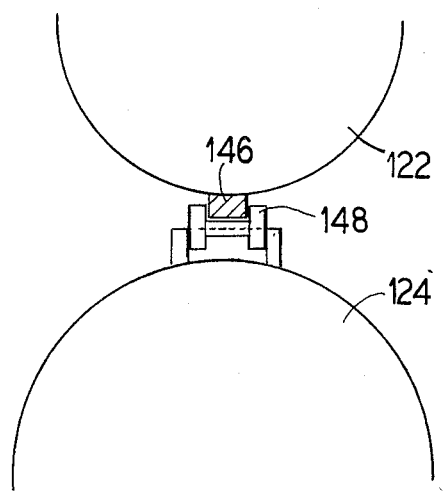
FIG. 12 is an enlarged fragmentary view of a guide means of the device shown in FIG. 9.

As shown more clearly in FIG. 12, the float 124 is slidably mounted on the standing tubes 122 by a guide rail 146 mounted on the standing tubes 122. A guide wheel 148 rotatably mounted on the float 124 engages the guide rail 146 and allows the float 124 to slide easily along the tubes 122.

Although the present device has been described for use with compressed air, it is also foreseen to use the present invention with hydraulic compression means to generate energy. Similarly, although the present device has been described as using generators to produce electricity, the motion of the floats may be used to produce any other form of energy, such as rotational energy, heat, and the like. Other energy sources, such as windmills, may also be placed on the platform.

The present invention provides a floating platform which is energetically self-sufficient and provides a stable base for any number of uses. The floating island can be moored, or anchored, at a location or can be mobile such as by the propulsion means 42. Energy for storing means can also be included so that the energy from the floats can be stored for use when it is otherwise unavailable, such as during calm seas. Individual ones of the floating units can be interconnected so that a continuous platform is formed to provide an extended development surface area and for the generation of large quantities of energy. The present device may be prefabricated and constructed directly on the ocean.

The floating units are shaped to provide minimal resistance to the movement of waves thereby reducing the possibility of destruction during storms and high seas. Furthermore, several of the embodiments disclosed herein include wave amplifying means in the form of conical units disposed beneath the surface of the waves to direct wave energy upward toward the vertically movable floats so that even in relatively calm waters energy can be generated.

Since the roughness of the water and the strength of the wave action is diferent in various bodies of water and at various locations, it is foreseen to construct the present device of various heights and materials so that each wave energy generating situation can be accomodated. For example, smaller waves would not require the platform to be as high above the surface of the water as would higher waves. To accomodate higher waves and the resulting greater vertical motion of the floats, the present floating platform when used in high seas must be much further above the water surface than that for inland lakes and for bays.

The present device produces energy without pollution or waste from a continuously renewable source. It provides a platform on which buildings and other structures can be built. The platform can be energy self-sufficient and is selectively movable under its own power. It can be built to scales appropriate for use on lakes, bays and open sea and it harvests an energy source that is widely available and currently not used.

It is apparent from the foregoing specification that the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

I claim:

1. An artificial island for use in energy production from ocean waves, comprising:
    a platform disposed atop the ocean surface,
    a plurality of vertically disposed rigid posts extending beneath said platform short of the ocean floor,
    a stationary wave amplifier affixed to said posts, said wave amplifier of a conical shape with inclined sides for directing water upwardly from substantially any lateral direction when submerged to amplify wave action,
    a movable inverted conical float slidably mounted for translational movement along said posts and disposed between said platform and said wave amplifier for movement with said waves, an apex of said conical float being directed substantially toward an apex of said conical wave amplifier,
    an energy-drive device disposed on said platform, and
    means for converting the motion of said float to transmittable energy for operating said energy-driven device.

2. A device as claimed in claim 1 further comprising:
    a plurality of floats and wave amplifiers disposed opposite each other beneath a continuous platform.

3. A device as claimed in claim 1, wherein means for converting motion to energy includes piston-compression means connected to ambient air and having discharge means for conducting compressed air to said energy-driven device, said energy-driven device being driven by compressed air.

4. A device as claimed in claim 1, wherein said energy-driven devices comprise an electrical generator.

5. A device as claimed in claim 1, wherein said energy-driven devices comprise a turbine.

6. An artificial island as claimed in claim 1, further comprising:

propulsion means for selectively inducing movement of said platform in the ocean.

7. An artificial island as claimed in claim 6, wherein said propulsion means includes a propeller and means for driving said propeller.

8. An artificial island as claimed in claim 7, wherein said propeller driving means is driven by compressed air.

9. An artificial island as claimed in claim 3, wherein said piston compression means is driven by a rotationally mounted geared wheel engaging a geared rail mounted for relative movement of said geared wheel on said geared rail upon translational motion of said float along said posts.

10. An artificial island as claimed in claim 1, further comprising:
    elongated semicircular riders embracing said vertically disposed posts for sliding movement therealong, said riders being mounted to said float for translational movement between said float and said platform.

11. An artificial island as claimed in claim 1, wherein a plurality of said platforms are connected together to form a continous platform structure, each of said platforms having disposed therebeneath one of said conical wave amplifiers and one of said translationally movable conical floats.

12. An artificial island as claimed in claim 1, wherein said motion converting means includes a bellows structure extending between said conical float and an underside of said platform to compress air as said float moves relative to said platform.

13. An artificial island as claimed in claim 1, wherein said motion converting means includes telescoping air compressors extending between said conical float and an underside of said platform to compress air as said float moves relative to said platform.

14. An artificial island as dlaimed in claim 1, wherein said transmittable energy includes compressed air, and further comprising:
    compressed air storage tanks mounted at an underside of said platform.

15. An artificial island for use in energy production from water waves, comprising:
    a platform disposed above the water surface;
    a frame extending beneath said platform short of the ocean floor;
    a movable float of conical shape slidably mounted for vertical translation movement on said frame for movement with said water waves;
    at least one compressed air reservoir forming a portion of said frame;
    at least one air compressor having an air inlet conduit for outside air and an air outlet conduit for compressed air, said air outlet conduit being connected to conduct compressed air to said compressed air reservoir;
    means for converting movement of said float to operate said at least one air compressor, said movement converting means including rack and pinion means for converting the translational motion of said float to rotational motion and means linked to said rack and pinion means for converting the rotational motion to compressed air; and
    means for converting compressed air stored in said compressed air reservoir to transmittable energy.

* * * * *